United States Patent
Gautam et al.

(10) Patent No.: US 12,335,918 B2
(45) Date of Patent: Jun. 17, 2025

(54) METHOD AND APPARATUS FOR MANAGEMENT DATA ANALYTICS SERVICE (MDAS) ASSISTED PAGING IN A WIRELESS COMMUNICATION SYSTEM

(71) Applicant: Samsung Electronics Co., Ltd., Suwon-si (KR)

(72) Inventors: Deepanshu Gautam, Bangalore (IN); Anikethan Ramakrishna Vijaya Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 409 days.

(21) Appl. No.: 17/801,394

(22) PCT Filed: Feb. 22, 2021

(86) PCT No.: PCT/KR2021/002196
§ 371 (c)(1),
(2) Date: Aug. 22, 2022

(87) PCT Pub. No.: WO2021/167423
PCT Pub. Date: Aug. 26, 2021

(65) Prior Publication Data
US 2023/0091815 A1    Mar. 23, 2023

(30) Foreign Application Priority Data

Feb. 21, 2020  (IN) .............................. 202041007507
Dec. 22, 2020  (IN) ............................ 2020 41007507

(51) Int. Cl.
H04W 24/02   (2009.01)
H04W 24/10   (2009.01)
(Continued)

(52) U.S. Cl.
CPC ........... *H04W 68/08* (2013.01); *H04W 24/02* (2013.01); *H04W 24/10* (2013.01); *H04W 68/02* (2013.01)

(58) Field of Classification Search
CPC ..... H04W 68/08; H04W 68/02; H04W 24/02; H04W 24/10
(Continued)

(56) References Cited

U.S. PATENT DOCUMENTS 10,892,958 B2   1/2021   Bor-Yaliniz et al.
2018/0110029 A1  4/2018  Kim et al.
(Continued)

FOREIGN PATENT DOCUMENTS

CN   104812069 A   7/2015
CN   106688288 A   5/2017
(Continued)

OTHER PUBLICATIONS

Indian Office Action dated Feb. 27, 2023, issued in Indian Patent Application No. 202041007507.
(Continued)

*Primary Examiner* — Ted M Wang
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure relates to providing at least a method and an apparatus for MDAS assisted paging.

15 Claims, 8 Drawing Sheets

(51) Int. Cl.
*H04W 68/02* (2009.01)
*H04W 68/08* (2009.01)

(58) Field of Classification Search
USPC .......................................................... 455/458
See application file for complete search history.

(56) References Cited

U.S. PATENT DOCUMENTS

| 2020/0252813 | A1 | 8/2020 | Li et al. | |
|---|---|---|---|---|
| 2022/0110181 | A1* | 4/2022 | Miao | H04L 1/1822 |
| 2022/0368617 | A1* | 11/2022 | Xin | H04L 41/5067 |

FOREIGN PATENT DOCUMENTS

| CN | 107005968 | A | 8/2017 |
|---|---|---|---|
| CN | 109803226 | A | 5/2019 |
| CN | 109996303 | A | 7/2019 |
| CN | 110267343 | A | 9/2019 |
| CN | 110300006 | A | 10/2019 |
| WO | 2019/032968 | A1 | 2/2019 |
| WO | 2020-014214 | A1 | 1/2020 |
| WO | 2020/025009 | A1 | 2/2020 |
| WO | 2020/033424 | A1 | 2/2020 |

OTHER PUBLICATIONS

Chinese Office Action dated Jun. Apr. 18, 2024, issued in Chinese Patent Application No. 202180016117.7.
Qualcomm Incorporated; RRC inactive and RAN paging end-to-end behaviour; SA WG2 Meeting #118; S2-166537; Nov. 2016, Reno, US.
3GPP TR 23.791 V16.1.0; 3rd Generation Partnership Project; Technical Specification Group Services and System Aspects; Study of Enablers for Network Automation for 5G (Release 16), Mar. 18, 2019.
Jingbo Yang, Lei Wei, Research on Fixed-distance Paging of Broadband Digital Trunk Communication System Based on LTE; Internet of Things Technology, Sep. 20, 2016.
Emmanouil Pateromichelakis; et al. End-to-End Data Analytics Framework for 5G Architecture; IEEE Access; Mar. 5, 2019.
Extended European Search Report dated Jun. 23, 2023, issued in European Patent Application No. 21756806.2.
Nokia, Nokia Shanghai Bell, AT&T, Convida Wireless; Use of analytics for UE mobility procedures; 3GPP TSG-SA WG2 Meeting #130; S2-1900960; Jan. 24, 2019, Kechi, India.
3GPP TR 28.809 V1 .1.0; 3rd Generation Partnership Project; Technical Specification Group Services and System Aspects; Management and orchestration; Study on enhancement of Management Data Analytics (MDA) (Release 17), Dec. 3, 2020.
3rd Generation Partnership Project; Technical Specification Group Services and System Aspects; Management and orchestration; 5G performance measurements (Release 16), 3GPP TS 28.552 V16.4.0, Jan. 2, 2020.
3rd Generation Partnership Project; Technical Specification Group Services and System Aspects; Management and orchestration; Study on enhancement of Management Data Analytics (MDA) (Release 17), 3GPP TR 28.809 V0.2.0, Jan. 2, 2020.

* cited by examiner

METHOD AND APPARATUS FOR MANAGEMENT DATA ANALYTICS SERVICE (MDAS) ASSISTED PAGING IN A WIRELESS COMMUNICATION SYSTEM

CROSS-REFERENCE TO RELATED APPLICATION(S)

This application is a U.S. National Stage application under 35 U.S.C. § 371 of an International application number PCT/KR2021/002196, filed on Feb. 22, 2021, which is based on and claims priority of an Indian patent application number 202041007507, filed on Feb. 21, 2020, in the Indian Patent Office, and of an Indian patent application number 202041007507, filed on Dec. 22, 2020, in the Indian Patent Office, the disclosure of each of which is incorporated by reference herein in its entirety.

TECHNICAL FIELD

The present invention relates to a Management Data Analytics Service (MDAS) in 5G. More particularly, the invention relates to the optimization of paging procedures in a 5G network utilizing the analytics service (MDAS) provided.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

In general, if the UE goes out-of-coverage (OOC) the paging which was initiated by the network Access and Mobility Management Function (AMF) fails. The re-attempts continues to fail until UE comes in the coverage and reacts to the paging attempts. This repetitive paging attempts result in the wastage of network resources.

Solution to Problem

The present disclosure relates to providing at least a method and system for MDAS assisted paging.

In an embodiment, a method performed by a core network entity in a wireless communication system is provided. The method comprises transmitting a message to request a paging analytics report (PAR) for a user equipment (UE) to a data analytics function; receiving, from the data analytics function, the PAR for the UE including first information associated with a time duration during which the UE is out of coverage and second information associated with a location before the UE going out of coverage; and determining to update a paging policy for the UE, based on the PAR for the UE received from the data analytics function.

In another embodiment, a method performed by a data analytics function in a wireless communication system is provided. The method comprises receiving, from a core network entity, a message to request a paging analytics report (PAR) for a user equipment (UE) to a data analytics function; obtaining performance measurements information associated with paging attempts for the UE; generating the PAR for the UE including first information associated with a time duration during which the UE is out of coverage and second information associated with a location before the UE going out of coverage, based on the performance measurements information; and transmitting the PAR for the UE to the core network entity.

In another embodiment, a core network entity in a wireless communication system is provided. The core network entity comprises a transceiver; and a controller configured to: transmit, to a data analytics function via the transceiver, a message to request a paging analytics report (PAR) for a user equipment (UE), receive, from the data analytics function via the transceiver, the PAR for the UE including first information associated with a time duration during which the UE is out of coverage and second information associated with a location before the UE going out of coverage, and determine to update a paging policy for the UE, based on the PAR for the UE received from the data analytics function.

In another embodiment, a data analytics function in a wireless communication system is provided. The data analytics function comprises a transceiver; and a controller configured to: receive, from a core network entity via the transceiver, a message to request a paging analytics report (PAR) for a user equipment (UE) to a data analytics function, obtain performance measurements information associated with paging attempts for the UE, generate the PAR for the UE including first information associated with a time duration during which the UE is out of coverage and second information associated with a location before the UE going out of coverage, based on the performance measurements information, and transmit, to the core network entity via the transceiver, the PAR for the UE.

A method implemented to use Management data analytic service (MDAS) to optimize the current paging procedures in 5G networks through MDAS assisted paging. MDAS producer provides an analytical report containing the user(s) paging analytics indicating the time window at which the user is OOC on a regular basis and hence will not be able to respond to the network-initiated paging. Based on the report MDAS consumer (for e.g., AMF) decides on whether, when, and where to initiate or not to initiate the paging procedures. The decision on the basis of the report ensures efficient paging procedures and optimal network resource utilization, as paging can be initiated when there are more chances for it to be successful.

In another embodiment, the invention comprises a generation of the Paging Analytics Report. The report is generated by the MDAS producer at a regular interval and delivered to the MDAS consumer on-request or as part of the subscription. The MDAS producer collects various types of data periodically from different sources. The data may further be analyzed using various AI techniques to ascertain whether the paging, if executed, for the target user(s) will succeed. In an aspect of the present invention, there is provided a method for paging of a User Equipment (UE) in a networking environment, the method comprising capturing, by a data analytics service, information related to successful and unsuccessful UE paging attempts for a particular location and time duration. The method further comprising requesting, by an Access and Mobility Function (AMF), a Paging Analytics Report (PAR) for one or more user equipment (UE) from the data-analytics service. The method further comprising generating the PAR for the UE based on said captured information related to successful and unsuccessful UE paging attempts, said PAR comprising one or more target UE experiencing out-of-coverage (OOC) network issue at least for a specific duration and/or in a specific location. The method further comprising ascertaining, by the AMF, based on the PAR received from the data analytics service whether to change a paging policy in real-time for one or more UE with respect to a current location and/or a time duration.

In another aspect of the present invention, there is provided a system for paging of a User Equipment (UE) in a networking environment, the system comprising a data analytics service provider configured for capturing, information related to successful and unsuccessful UE paging attempts for at least one UE for a particular location and time duration. The system further comprising generating the PAR for the at least one UE based on said captured information related to successful and unsuccessful UE paging attempts, said PAR comprising one or more target UE experiencing out-of-coverage (OOC) network issue at least for a specific duration and/or in a specific location. The system further comprising an Access and Mobility Function (AMF) configured for: requesting for a Paging Analytics Report (PAR) for one or more user equipment (UE) from the data-analytics service provider, and ascertaining based on the PAR received from the data analytics service whether to change a paging policy in real-time for one or more UE with respect to a current location and/or a time duration.

In an embodiment of the invention, the report also provides remedial actions, for example, stop paging the UE, initiate self-organizing networks (SON) procedures, etc.

To further clarify the advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The present disclosure will be described and explained with additional specificity and detail with the accompanying drawings.

Advantageous Effects of Invention

The present disclosure provides a method and an apparatus for Management Data Analytics Service (MDAS) assisted paging. A disclosure implements the use of MDAS to optimize the current paging procedures in 5G networks through MDAS assisted paging. Further, the present disclosure also provides the required intelligence to the Network Access and Mobility Management Function (AMF) using which the network can intelligently decide whether, when, and where to page the UE.

MODE FOR THE INVENTION

Figure 1:
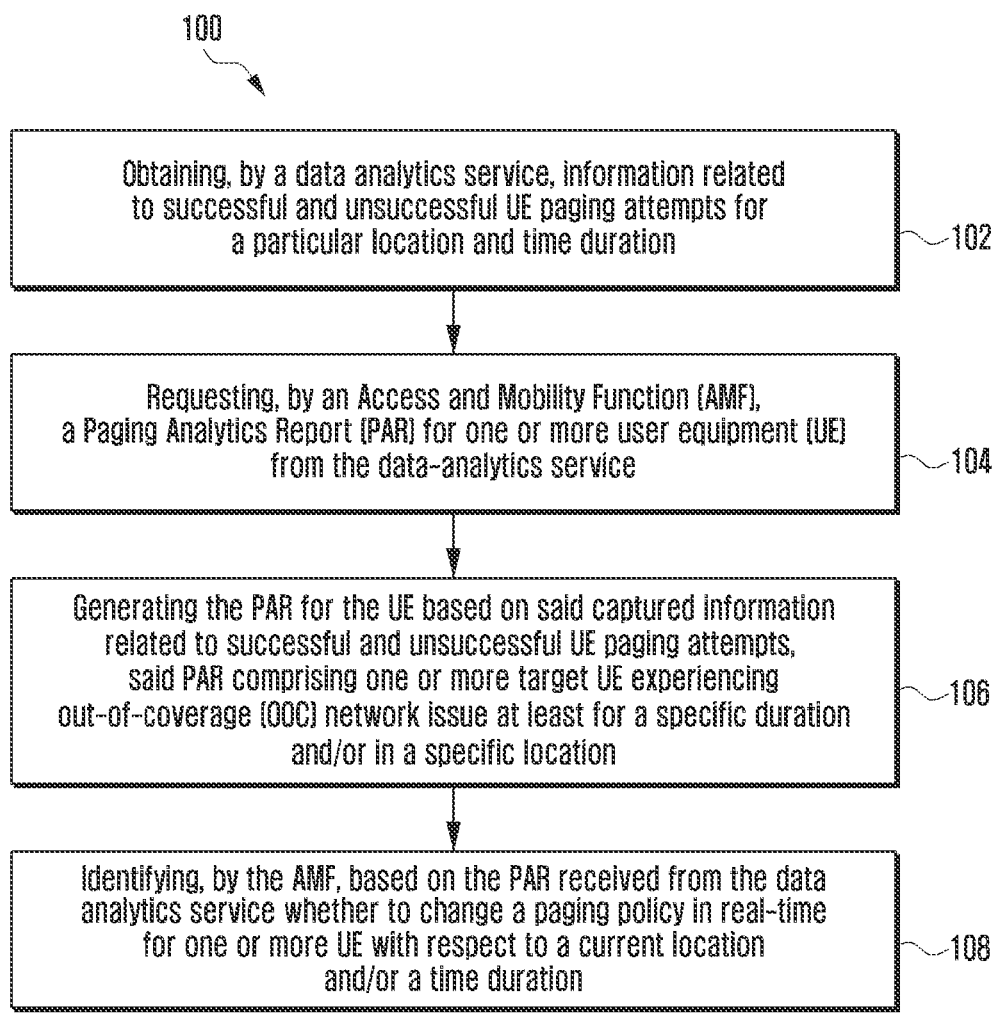
FIG. 1 illustrates a control-flow for a method for paging of a User Equipment (UE) in a networking environment, in accordance with an embodiment of the present invention.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more User Equipment (UE) or sub-systems or elements or structures or components proceeded by "comprises . . . a" does not, without more constraints, preclude the existence of other UE or other sub-systems or other elements or other structures or other components or additional UE or additional sub-systems or additional elements or additional structures or additional components.

Unless otherwise defined, all technical and scientific terms used herein have the same meaning as commonly understood by one of ordinary skilled in the art to which this disclosure belongs. The system, method, and examples provided herein are illustrative only and not intended to be limiting.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

For communication, the User Equipment (UE) (or the terminal) like mobile cellular phones relies on the connectivity with the base station (BS). Always there lies a possibility that, at some moment of time, the UE comes in a restricted area, generally known as Out-of-coverage (OOC) network, where it may be far away from the cellular antenna, as a consequence of which cellular signals get blocked thereby causing communication outage. For example, in a daily routine scenario, while commuting through an underground area such as tunnels, or traversing through elevators, etc., momentarily, the UE goes into the OOC area.

Typically, a Management Data Analytics Service (MDAS) offers data analytics of different network-related parameters including for example load level and/or resource utilization. For example, the MDAS for a Network Function (NF) may collect the NF's load related performance data, such as the resource usage status of the NF. The analysis of the collected data may provide a forecast of resource usage information in a predefined future time. Further, the aforesaid analysis may also recommend appropriate actions, such as the scaling of resources, admission control, load balancing of traffic, etc.

The MDAS for a Network Slice Subnet Instance (NSSI) may also provide NSSI related data analytics. The service may consume the corresponding MDAS of its constituent NFs'. The NSSI MDAS may further classify or shape the data in different useful categories and analyze them for different network slice subnet management needs (e.g., scaling, admission control of the constituent NFs, etc.). If an NSSI is composed of multiple other NSSIs, the NSSI MDAS acts as a consumer of MDAS of the constituent NSSIs for further analysis e.g., resource usage prediction, failure prediction for an NSSI, etc.

The MDAS for a Network Slice Instance (NSI) provides NSI related data analytics. The service may consume the corresponding MDAS of its constituent NSSI(s). The NSI MDAS may further classify or shape the data in different useful categories according to different customer needs, e.g., slice load, constituent NSSI load, communication service loads. The aforesaid data can be used for further analysis e.g., resource usage prediction, failure prediction for an NSI, etc.

In general, as per the current procedures, if the UE goes OOC the paging which was initiated by the network Access and Mobility Management Function (AMF) fails. The re-attempts continues to fail until UE comes in the coverage and reacts to the paging attempts. This repetitive paging attempts result in the wastage of network resources. As an example, the use case includes a user or a group of users getting into an area, with no cellular coverage on a regular basis for a considerably long duration, for e.g., the user gets into a shielded room for some testing purpose every day for a defined period. The Network initiated paging for such users will fail until they are back in the area with cellular coverage. This would result in in-efficient network resource usage.

It is desirable to use MDAS (Management data analytic service) to optimize the current paging procedures in 5G networks. MDAS producer provides an analytical report containing the user(s) paging analytics indicating the time window at which the user is OOC on a regular basis at the particular location and hence will not be able to respond on a network initiated paging. Based on the report MDAS consumer (e.g., AMF, gNB) decides on whether, when, and where to initiate or not to initiate the paging procedures, thereby ensuring efficient paging procedures and optimal network resource utilization, as paging can be initiated only when there are more chances for it to be successful.

At least to address aforesaid constraints, there lies a need for obviating aforesaid drawbacks plaguing the state of the art of existing paging mechanism which can be optimized using MDAS, by minimizing the chances for a probable paging failure and better network resource utilization.

The present disclosure provides a method and an apparatus for Management Data Analytics Service (MDAS) assisted paging. A disclosure implements the use of MDAS to optimize the current paging procedures in 5G networks through MDAS assisted paging. Further, the present disclosure also provides the required intelligence to the Network Access and Mobility Management Function (AMF) using which the network can intelligently decide whether, when, and where to page the UE. The method comprises the generation of the Paging Analytics Report through an MDAS producer that periodically collects at least per UE per day data from various sources. Based on the generated report and the recommendations, the AMF decides whether to change the paging strategy for a particular UE or a group of UE. The AMF may not page the UE during the period provided as Daily-OOC-Duration if the last known UE location is the location identified by Daily-OOC-Location.

The adaptive paging decision by AMF may decrease the chances of paging failure, resulting in better utilization of network resources.

FIG. 1 depicts a control-flow for a method for paging of a User Equipment (UE) in a networking environment, in accordance with another example embodiment of the present subject matter.

In an embodiment, there is provided a method for MDAS assisted paging wherein an MDAS Producer collects performance data.

At operation 102, obtaining (capturing) of information by a data analytics service related to successful and unsuccessful paging attempts of one or more UE by the data-analytics service for a particular location and time duration takes place. The MDAS producer collects the following per UE per day data from various sources periodically.

At operation 104, a Paging Analytics Report (PAR) is requested by an Access and Mobility Function (AMF) for one or more user equipment (UE) from the data-analytics service.

At operation 106, the PAR for the UE based on the obtained(captured) information related to successful and unsuccessful UE paging attempts is generated by the data-analytics service. The PAR comprising information related to one or more target UE experiencing out-of-coverage (OOC) network issue at least for a specific duration and/or in a specific location. The MDAS Producer further analyses the data and generates the report. Based on the report and the recommendations provided, the AMF decides whether to change(update) the paging strategy for a particular UE or a group of UE. If the paging policy needs to be changed, the AMF may decide whether, when, and where to page the UE.

At operation 108, based on the PAR received from the data analytics service the AMF may identifying (ascertaining) whether to change a paging policy in real-time for one or more UE with respect to a current location and/or a time duration. The AMF identifies(ascertains) the paging policy modification decision as a positive decision by determining a high probability of unsuccessful paging attempt with respect to the UE for the current location and/or the current time duration. A positive paging policy modification decision directed to changing a paging policy for the UE may be undertaken. As a result of the positive paging modification decision, the paging of one or more UE is suspended by the AMF in real time at least during:

a time-instant corresponding to the occurrence of OOC time duration in the PAR; and an arrival of UE at a location corresponding to the OOC-Location in the PAR Specifically, the AMF may not page the UE during the period provided as Daily Out-Of-Coverage (OOC)-Duration if the last known UE location is the location identified by Daily-OOC-Location. Daily-OOC-Duration and Daily-OOC-Location will be included in the Paging Analytics Report mentioning the time window during which UE is out-of-coverage every day at a particular last known location.

In another example, identifying(ascertaining) the paging policy modification decision comprises undertaking a negative paging policy modification decision. Such negative decision comprises determining a high probability of successful paging attempt with respect to the UE for a current location and/or a current time duration. A negative paging policy modification decision directed to not change the paging policy for the UE is then undertaken. Accordingly, the paging policy is maintained as unchanged for the one or more UE with respect to the current location and/or the current time duration as a result of the negative paging modification decision. As a result, paging of the UE with respect to the current location and/or a current time duration is initiated by the AMF in real-time based on the unchanged paging policy.

In MDAS assisted paging, the requirements on the MDAS Producer are as follows:

The MDAS producer should have a capability allowing the authorized consumer to get the paging analytics report describing paging results for a particular user or a group of users.

The MDAS producer should have the capability to provide the paging analytics report describing the paging results based on successful and un-successful paging attempts at a particular time and duration.

The paging analytics report describing the paging results should contain the following information:

User Identification: Identification of the user or a group of users.

Daily-OOC-Duration: Identifying the time window during which UE is out-of-coverage every day.

Daily-OOC-Location: Identifying the last known location before UE going out-of-coverage every day.

Recommended Action: The recommendation may suggest stopping paging the UE for Daily-OOC-Duration at Daily-OOC-Location.

Figure 2:
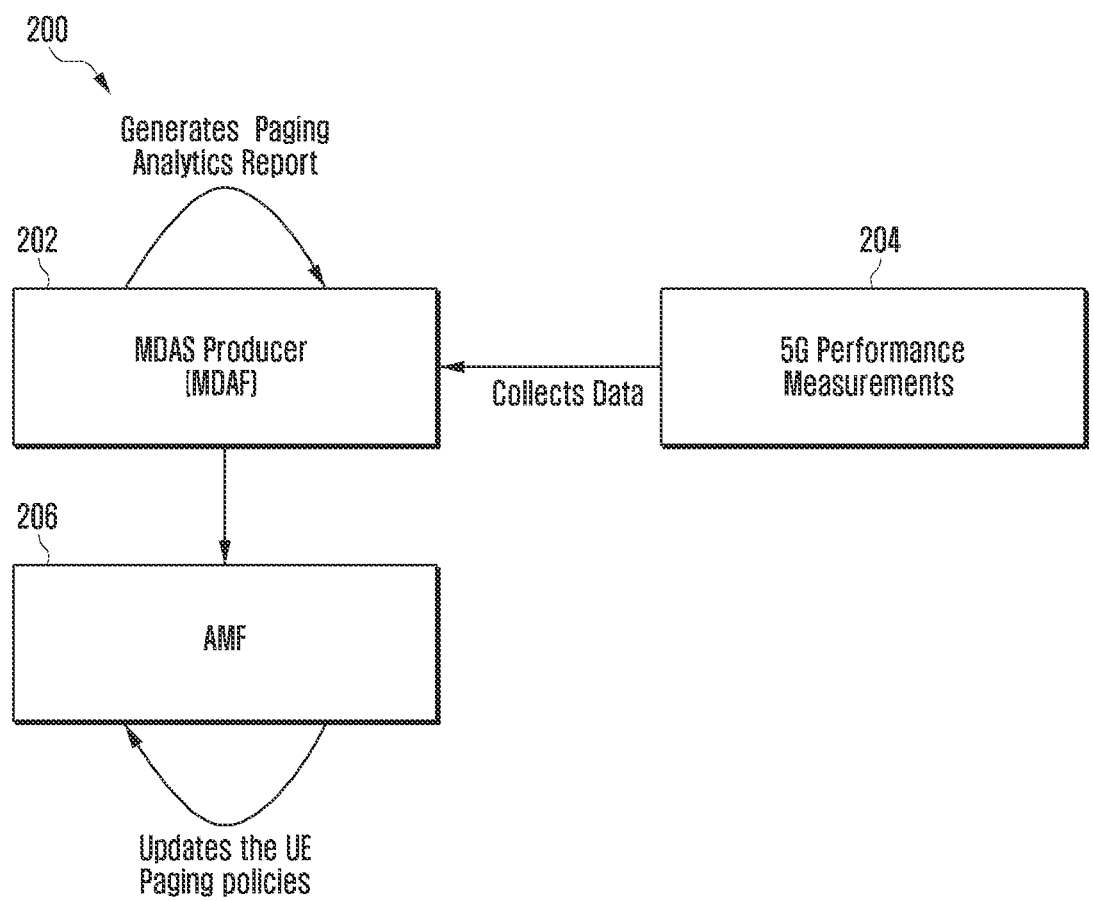
FIG. 2 illustrates the interaction between MDAS Producer and Access and Mobility Management Function (AMF) required for MDAS assisted paging, in accordance with an embodiment of the present invention.

FIG. 2 depicts the interaction 200 between MDAS Producer 202 and Access and Mobility Management Function (AMF) 206 required for MDAS assisted paging, in accordance with an embodiment of the present invention.

In an embodiment, the MDAS Producer 202 (e.g. MDAF) may collect (obtain) data or information associated with 5G performance measurements (204). The MDAS Producer 202 may generate a paging analytics report based on the collected data (200). The MDAS Producer 202 may provide (transmit) the paging analytics report to the AMF 206. The AMF 206 may update the UE paging policies based on the paging analytics report.

Figure 3A:
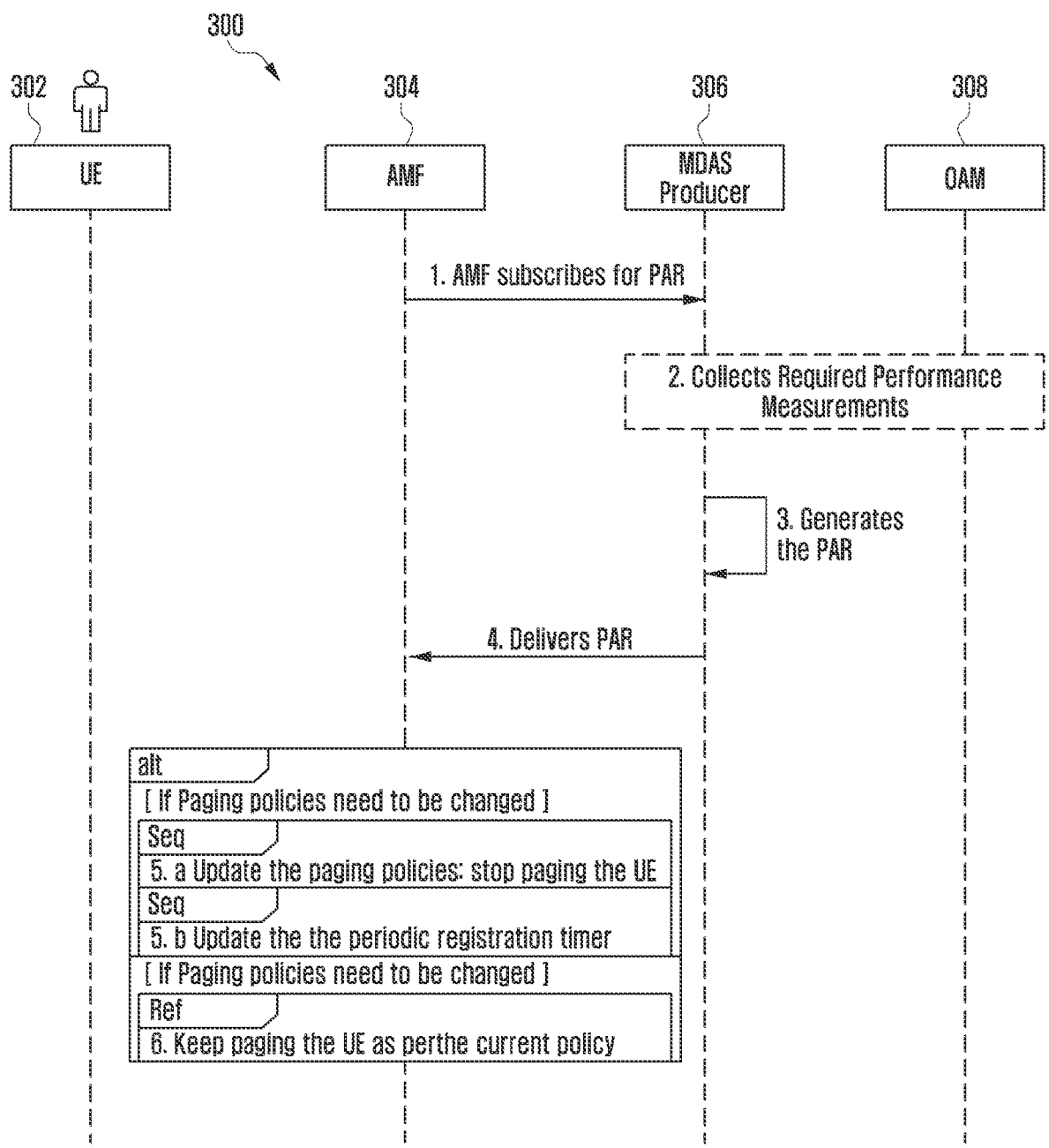
FIG. 3A illustrates a control flow depicting the MDAS assisted paging, in accordance with an embodiment of the present invention.
Figure 3B:
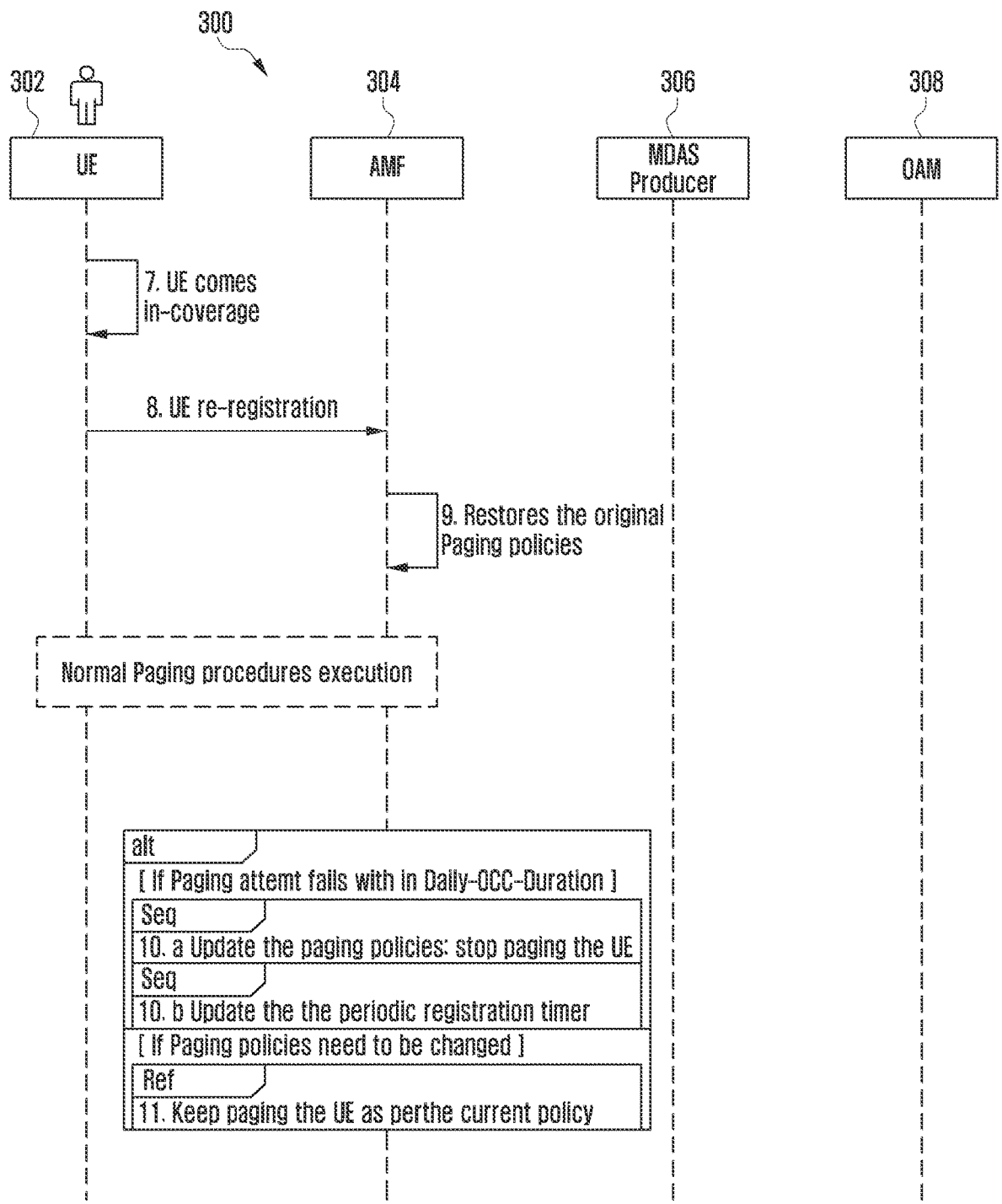
FIG. 3B illustrates a control flow depicting the MDAS assisted paging, in accordance with an embodiment of the present invention.

FIGS. 3A and 3B depicts a control flow 300 depicting the MDAS assisted paging, in accordance with an embodiment of the present invention. In an implementation, the method for MDAS assisted paging comprises the following steps:

At step 1: The AMF 304 is subscribed to obtain the Paging Analytics Report (RAR) for a user or a group of the user from MDAS producer 306. The subscription request may include:

a. Identification for the target user or a group of the user;

b. Reporting interval (e.g. daily, twice a day)

At step 2: The MDAS Producer 306 collects (obtains) performance data. For example, the MDAS Producer 306 may receive performance measurements from the OAM 308. The MDAS producer 306 periodically collects the following Table 1 per UE 302 per day data from various sources:

TABLE 1

| Category | Data | Description |
| --- | --- | --- |
| Performance Measurements | Number of successful paging attempt | Total number of successful paging attempt |
| | Successful Timestamp | The timestamp for each successful paging attempt |

TABLE 1-continued

| Category | Data | Description |
|---|---|---|
| | Successful Location | Last known location of UE |
| | Number of un-successful paging attempt | Total number of un-successful paging attempt |
| | Un-Successful Timestamp | The timestamp for each un-successful paging attempt |
| | Un-Successful Location | Last known location of UE |

At step 3: The MDAS Producer 306 analyzes the data and generates the report.

At step 4: The MDAS Producer 306 provides(transmits) the Paging Analytics Report, as per the reporting interval, containing the following:
  a. User Identification: Identification of the user or a group of users.
  b. Daily-OOC-Duration: Identifying the time window during which UE 302 is out-of-coverage every day.
  c. Daily-OOC-Location: Identifying the last known location before UE 302 going out-of-coverage every day.
  d. Recommended Action: The recommendation may suggest stopping paging the UE for Daily-OOC-Duration at Daily-OOC-Location.

At step 5: Based on the report and the recommendations provided, the AMF 304 decides whether to change(update) the paging strategy for a particular UE 302 or a group of UE 302. If the paging policy needs to be changed:
  a. The AMF 304 may decide whether, when, and where to page the UE 302. The AMF 304 may not page the UE 302 during the period provided as Daily-OOC-Duration if the last known UE 302 location is the location identified by Daily-OOC-Location. Daily-OOC-Duration and Daily-OOC-Location are further included in the Paging Analytics Report mentioning the time window during which UE 302 is out-of-coverage every day at a particular last known location.
  b. The AMF 304 may also use the periodic registration timer to force a quicker interval of periodic updates by the UE 302. The AMF 304 can assign a smaller timer value to the UE 302 sometime before the start of the OOC period retrieved from MDAS Producer 306. This will ensure that in case the UE 302 comes back to coverage during the OOC period, the periodic timer would have expired, and the UE 302 will trigger a registration towards the network and thus notify its availability for MT services.

At step 6: If there is no need to change the paging policy then AMF 304 may carry on with the existing paging procedures.

As per the current mechanism, UE 302 may not indicate to the network when it comes back to the area of coverage. The network has to keep on sending the paging request, which UE 302 will react if it is in-coverage. Considering the current invention, the network may stop paging the UE 302 for the duration of Daily-OOC-Duration. In this case, if UE 302 comes in coverage during the Daily-OOC-Duration, the next actions may occur are as follows:

At step 7: If UE 302 comes in coverage, it should indicate its presence in the network to the AMF by invoking the registration/re-registration procedure.

At step 8: The UE 302 attempts a registration/re-registration procedure after T3512 expires.

At step 9: The AMF may re-store the normal Paging procedures towards the UE 302.

At step 10: Thereafter, if consecutive Paging attempt fails within the Daily-OOC-Duration, the following steps are followed:
  a. AMF 304 will activate the Daily-OOC-Duration and will not page UE 302 until the Daily-OOC-Duration.
  b. AMF 304 can also use the periodic registration timer to force a quicker interval of periodic updates by the UE 302. The AMF 304 can assign a smaller timer value to the UE 302 sometime before the start of the OOC period retrieved from MDAS Producer 306. This will ensure that in case the UE 302 comes back to coverage during the OOC period, the periodic timer would have expired, and the UE 302 will trigger a registration towards the network and thus notify its availability for MT services.

At step 11: If the paging attempt does not fail, AMF 304 may carry on with the existing paging procedures.

In another implementation, the method for MDAS assisted paging comprises the following stages:

1. AMF 304 decides to page the UE 302. AMF 304, acting as MDAS consumer, sends(transmits or delivers) a request (request message) for Paging Analytics Report (RAR) for a user or a group of users to MDAS producer 306 (for e.g., management data analytics function (functionality); MDAF).

2. MDAS Producer 306 collects (obtains) performance data. For example, the MDAS Producer 306 may receive performance measurements from the OAM 308. MDAS producer 306 collects the following Table 2 per UE 302 per day data from various sources periodically.

TABLE 2

| Category | Data | Description |
|---|---|---|
| Performance Measurements | Number of successful paging attempt | Total number of successful paging attempt |
| | Successful Timestamp | The timestamp for each successful paging attempt |
| | Successful Location | Last known location of UE |
| | Number of un-successful paging attempt | Total number of un-successful paging attempt |
| | Un-Successful Timestamp | The timestamp for each un-successful paging attempt |
| | Un-Successful Location | Last known location of UE |

3. MDAS Producer 306 analyzes the data and generates the report.

4. MDAS Producer 306 provides(transmits) the Paging Analytics Report containing the following:
  a. User Identification: Identification of the user or a group of the user for which the report is provided.
  b. Daily-OOC-Duration: Identifying the time window during which UE 302 is out-of-coverage every day.
  c. Daily-OOC-Location: Identifying the last known location before UE 302 going out-of-coverage every day.
  d. Recommended Action: The recommendation may suggest stopping paging the UE for Daily-OOC-Duration at Daily-OOC-Location.

5. Based on the report and the recommendations provided, the AMF 304 decides whether to change(update) the paging strategy for a particular UE 302 or a group of UE 302. If the paging policy needs to be changed:
  a. The AMF 304 may decide whether, when, and where to page the UE 302. The AMF 304 may not page the UE 302 during the period provided as Daily-OOC-Duration if the last known UE 302 location is the location identified by Daily-OOC-Location. Daily-OOC-Duration and Daily-OOC-Location will be included in the Paging Analytics Report mentioning the time window during which UE 302 is out-of-coverage every day at a particular last known location.

b. The AMF 304 may also use the periodic registration timer to force a quicker interval of periodic updates by the UE. The AMF 304 can assign a smaller timer value to the UE 302 sometime before the start of the OOC period retrieved from MDAS Producer 306. This will ensure that in case the UE 302 comes back to coverage during the OOC period, the periodic timer would have expired, and the UE 302 will trigger a registration towards the network and thus notify its availability for MT services.

6. If there is no need to change the paging policy then AMF 304 may carry on with the existing paging procedures.

As per the current mechanism, UE 302 may not indicate to the network when it comes back to the area of coverage. The network has to keep on sending the paging request, which UE 302 will react if it is in-coverage. Considering the current invention, the network may stop paging the UE 302 for the duration of Daily-OOC-Duration. In this case, if UE 302 comes in coverage during the Daily-OOC-Duration, the next actions may occur are as follows:

7. If UE 302 comes in coverage, it should indicate its presence in the network to the AMF 304 by invoking the registration/re-registration procedure.

8. The UE 302 attempts a registration/re-registration procedure after T3512 expires.

9. The AMF 304 may restore the normal Paging procedures towards the UE 302.

10. If a consecutive Paging attempt fails within the Daily-OOC-Duration, the following steps are followed:

a. AMF 304 will activate the Daily-OOC-Duration and will not page UE 302 until the Daily-OOC-Duration.

b. AMF 304 can also use the periodic registration timer to force a quicker interval of periodic updates by the UE. The AMF 304 can assign a smaller timer value to the UE 302 sometime before the start of the OOC period retrieved from MDAS Producer 306. This will ensure that in case the UE 302 comes back to coverage during the OOC period, the periodic timer would have expired, and the UE 302 will trigger a registration towards the network and thus notify its availability for MT services.

11. If the paging attempt does not fail, AMF 304 may carry on with the existing paging procedures.

Figure 4:
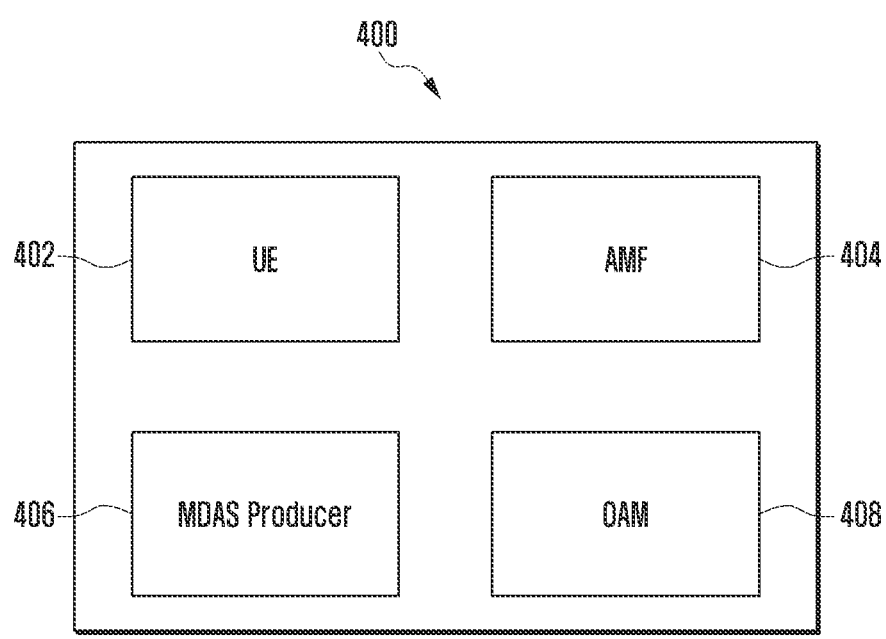
FIG. 4 illustrates a system for MDAS assisted paging, in accordance with an embodiment of the present invention.

FIG. 4 illustrates a system 400 for management data analytics service (MDAS) provider assisted paging, in accordance with an embodiment of the present invention. The system comprising at least a User Equipment (UE) 402, an MDAS producer 404, an AMF 404, and an operation, administration, and maintenance (OAM) 408 interacting with each other.

The system 400 for paging of the UE 402 in a networking environment comprising the MDAS provider configured for obtaining (capturing), information related to successful and unsuccessful UE 402 paging attempts for at least one UE 402 for a particular location and time duration. The system 400 further comprising generating the PAR for the at least one UE 402 based on said obtained(captured) information related to successful and unsuccessful UE 402 paging attempts, said PAR comprising one or more target UE 402 experiencing out-of-coverage (OOC) network issue at least for a specific duration and/or in a specific location. The system 400 further comprising the AMF 404 configured for: requesting by a Paging Analytics Report (PAR) for one or more UE 402 from the data-analytics service provider and identifying(ascertaining) based on the PAR received from the data analytics service whether to change a paging policy in real-time for one or more UE 402 with respect to a current location and/or a time duration.

Figure 5:
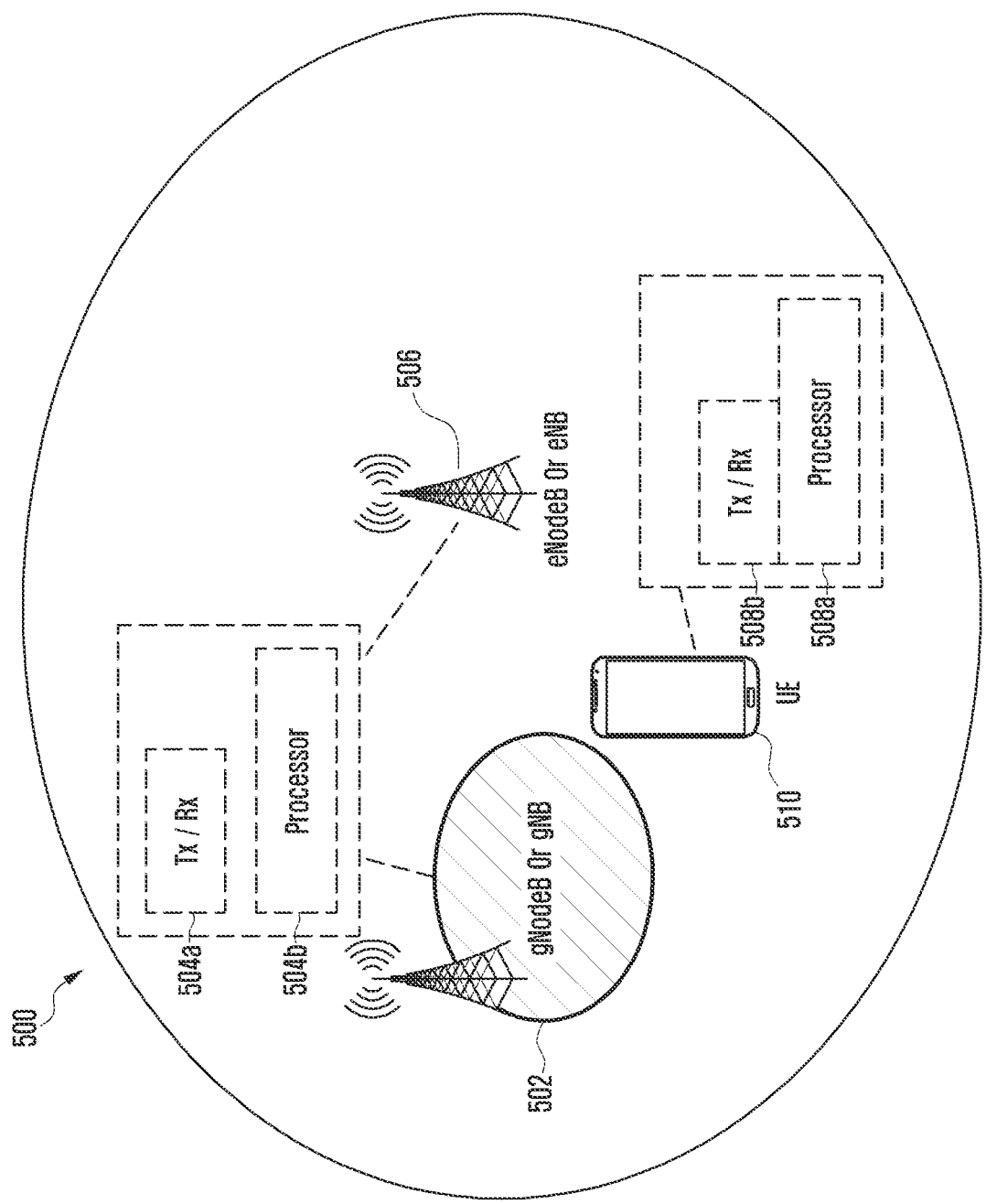
FIG. 5 illustrates MDAS assisted paging implementation in a networking environment and a computing device, in accordance with an embodiment of the present invention.

FIG. 5 depicts an example of implementation in a networking environment 500 and a computing-device based implementation, in accordance with the embodiment of the present subject matter. In an embodiment as depicted by FIG. 5, the above-mentioned features of the present disclosure can be executed by a computing-system residing in UE 510, eNodeB 506, gNodeB 502. Each of the UE 510, eNodeB 506, gNodeB 502 also comprises a transceiver (Tx/Rx) 504*a*.

In an implementation, the UE 510 may include a processor 508*a*, a transceiver, a transmit/receive element 508*b*, a speaker/microphone, a keypad, a display/touchpad, non-removable memory, removable memory, a power source, a global positioning system (GPS) chipset, and other peripherals. The processor 508*a* may be a general-purpose processor, a special-purpose processor, a conventional processor, a digital signal processor (DSP), a plurality of microprocessors, one or more microprocessors in association with a DSP core, a controller, a microcontroller, etc.

The transmit/receive element 508*b* may be configured to transmit signals to, or receive signals from, a base station (e.g., the base station) over the air interface. For example, in one embodiment, the transmit/receive element may be an antenna configured to transmit and/or receive RF signals. The transmit/receive element 508*b* may include any number of transmitting/receiving elements. More specifically, the WTRU may employ MIMO technology. Thus, in one embodiment, the WTRU may include two or more transmit/receive elements 508*b* (e.g., multiple antennas) for transmitting and receiving wireless signals over the air interface.

The transceiver may be configured to modulate the signals that are to be transmitted by the transmit/receive element and to demodulate the signals that are received by the transmit/receive element. The processor may also be coupled to the GPS chipset, which may be configured to provide location information (e.g., longitude and latitude) regarding the current location of the WTRU. In addition to, or in lieu of, the information from the GPS chipset, the WTRU may receive location information over the air interface from a base station (e.g., base stations) and/or determine its location based on the timing of the signals being received from two or more nearby base stations.

Figure 6:
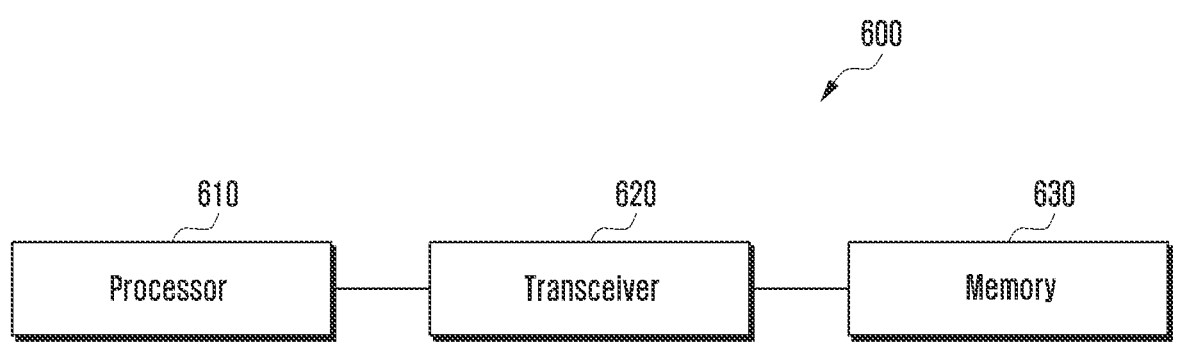
FIG. 6 illustrates a core network entity in accordance with an embodiment of the present invention.

FIG. 6 illustrates a core network entity in accordance with an embodiment of the present invention.

Referring to the FIG. 6, the core network entity (e.g. AMF) 600 may include a processor (or controller) 610, a transceiver 620 and a memory 630. However, all of the illustrated components are not essential. The core network entity 600 may be implemented by more or less components than those illustrated in FIG. 6. In addition, the processor 610 and the transceiver 620 and the memory 630 may be implemented as a single chip according to another embodiment.

The processor (or controller) 610 may include one or more processors or other processing devices that control the proposed function, process, and/or method. Operation of the core network entity 600 may be implemented by the processor 610. In an embodiment, the processor 610 may identify whether to change a paging policy for one or more UE with respect to a particular location and/or a particular time duration.

The transceiver 620 may be connected to the processor 610 and transmit and/or receive a signal, a message, data or information. In an embodiment, the paging analytics report may be received from the data analytics function via the transceiver 620.

The memory 630 may be connected to the processor 610 and store at least one instruction or a protocol or a parameter for the proposed function, process, and/or method. In an embodiment the memory 630 may store the paging analytics report. The memory 630 may include read-only memory (ROM) and/or random access memory (RAM) and/or hard disk and/or CD-ROM and/or DVD and/or other storage devices.

Figure 7:
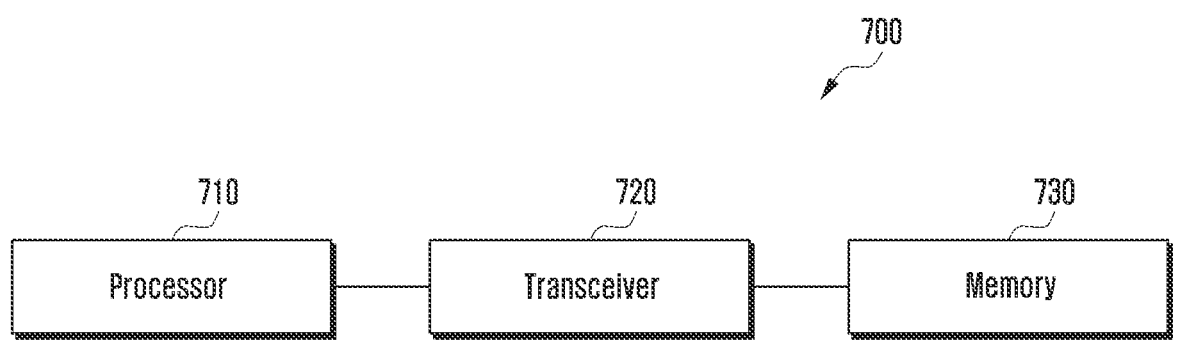
FIG. 7 illustrates a data analytics function accordance with an embodiment of the present invention.

FIG. 7 illustrates a data analytics function accordance with an embodiment of the present invention.

Referring to the FIG. 7, the data analytics function (e.g. MDAF) 700 may include a processor (or controller) 710, a transceiver 720 and a memory 730. However, all of the illustrated components are not essential. The data analytics function 700 may be implemented by more or less components than those illustrated in FIG. 7. In addition, the processor 710 and the transceiver 720 and the memory 730 may be implemented as a single chip according to another embodiment.

The processor (or controller) 710 may include one or more processors or other processing devices that control the proposed function, process, and/or method. Operation of the data analytics function 700 may be implemented by the processor 710. In an embodiment, the processor 710 may generate the paging analytics report.

The transceiver 720 may be connected to the processor 710 and transmit and/or receive a signal, a message, data or information. In an embodiment, the paging analytics report may be transmitted to the core network entity via the transceiver 720.

The memory 730 may be connected to the processor 710 and store at least one instruction or a protocol or a parameter for the proposed function, process, and/or method. In an embodiment the memory 730 may store the paging analytics report. The memory 730 may include read-only memory (ROM) and/or random access memory (RAM) and/or hard disk and/or CD-ROM and/or DVD and/or other storage devices.

In view of the aforesaid, there are provided various advantageous features relating to the present disclosure:

Using the present solution, the Paging success rate will increase.

Using the present invention AMF can make an intelligent decision on whether, when, and where to initiate paging, resulting in optimal network resource utilization.

In the case of implementation, an embodiment of the present invention may be implemented by using hardware only, by using software and a necessary universal hardware platform. The present invention may be implemented in the form of a procedure, function, module, etc. that implements the functions or operations described above. Based on such understandings, the technical solution of the present invention may be embodied in the form of software. The software may be stored in a non-volatile or non-transitory storage medium, which can be a compact disk read-only memory (CD-ROM), USB flash disk, or a removable hard disk. The software product includes a number of instructions that enable a computer device (the personal computer, server, or network device) to execute the methods provided in the embodiments of the present invention. For example, such execution may correspond to a simulation of the logical operations as described herein. The software product may additionally or alternatively include a number of instructions that enable a computer device to execute operations for configuring or programming a digital logic apparatus in accordance with embodiments of the present invention.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method performed by an access and mobility function (AMF) in a wireless communication system, the method comprising:
receiving, from a management data analytic service (MDAS) producer, a paging analytics report including first information on a time window during which at least one user equipment (UE) is out of coverage and second information on a last known location of the at least one UE before going out of coverage; and
deciding on whether, when and where to initiate a paging procedure based on the paging analytics report.

2. The method of claim 1,
wherein the MDAS producer supports a capability for the paging analytics report describing paging results for a group of users.

3. The method of claim 1, wherein the MDAS producer supports a capability for the paging analytics report describing paging results being based on successful and un-successful paging attempts at a particular time and duration.

4. The method of claim 1, wherein the deciding on whether when and where to initiate the paging procedure further comprises:
deciding on whether, when and where to initiate the paging procedure, thereby ensuring efficient paging procedures and optimal network resource utilization, as paging can be initiated only when there are more chances to be successful.

5. A method performed by a management data analytic service (MDAS) producer in a wireless communication system, the method comprising:
generating a paging analytics report including first information on a time window during which at least one user equipment (UE) is out of coverage and second information on a last known location of the at least one UE before going out of coverage; and
transmitting, to an access and mobility function (AMF), the generated paging analytics report,
wherein the paging analytics report is associated with whether, when and where to initiate a paging procedure.

6. The method of claim 5, wherein the MDAS producer supports a capability for the paging analytics report describing paging results for a group of users and a capability for the paging analytics report describing paging results being based on successful and un-successful paging attempts at a particular time and duration.

7. The method of claim 5,
wherein the paging analytics report is associated with whether, when and where to initiate the paging procedure, thereby ensuring efficient paging procedures and optimal network resource utilization, as paging can be initiated only when there are more chances to be successful.

8. An access and mobility function (AMF) in a wireless communication system, the AMF comprising:
a transceiver; and
a controller configured to:
receive, from a management data analytic service (MDAS) producer via the transceiver, a paging analytics report including first information on a time window during which at least one user equipment (UE) is out of coverage and second information on a last known location of the at least one UE before going out of coverage, and
decide on whether, when and where to initiate a paging procedure based on the paging analytics report.

9. The AMF of claim 8, wherein the MDAS producer supports a capability for the paging analytics report describing paging results for a group of users.

10. The AMF of claim 8, wherein the MDAS producer supports a capability for the paging analytics report describing paging results being based on successful and un-successful paging attempts at a particular time and duration.

11. The AMF of claim 8,
wherein the controller is further configured to decide on whether, when and where to initiate the paging procedure, thereby ensuring efficient paging procedures and optimal network resource utilization, as paging can be initiated only when there are more chances to be successful.

12. A management data analytic service (MDAS) producer in a wireless communication system, the MDAS producer comprising:
a transceiver; and
a controller configured to:
generate a paging analytics report including first information on a time window during which at least one user equipment (UE) is out of coverage and second information on a last known location of the at least one UE before going out of coverage, and
transmit, to an access and mobility function (AMF) via the transceiver, the generated paging analytics report,
wherein the paging analytics report is associated with whether, when and where to initiate a paging procedure.

13. The MDAS producer of claim 12, wherein the MDAS producer supports a capability for the paging analytics report describing paging results for a group of users.

14. The MDAS producer of claim 12, wherein the MDAS producer supports a capability for the paging analytics report describing paging results being based on successful and un-successful paging attempts at a particular time and duration.

15. The MDAS producer of claim 12,
wherein the paging analytics report is associated with whether, when and where to initiate the paging procedure, thereby ensuring efficient paging procedures and optimal network resource utilization, as paging can be initiated only when there are more chances to be successful.

* * * * *